United States Patent [19]
Stenersen et al.

[11] 3,875,549
[45] Apr. 1, 1975

[54] TRANSMITTER TRIGGER CIRCUIT FOR ECHO-SOUNDERS OR SIMILAR DEVICES

[75] Inventors: Erik Stenersen; Sverre Johannessen, both of Horten, Norway

[73] Assignee: Simrad A.S., Horten, Norway

[22] Filed: June 27, 1973

[21] Appl. No.: 374,103

[30] Foreign Application Priority Data
June 27, 1972 Norway................................ 2294/72

[52] U.S. Cl. ................................. 340/3 E, 343/7.5
[51] Int. Cl. ............................................ G01s 9/68
[58] Field of Search ................. 340/1 C, 3 E, 3 R; 343/7.5

[56] References Cited
UNITED STATES PATENTS
| | | | |
|---|---|---|---|
| 3,500,302 | 3/1970 | Moss, Jr. et al. | 340/3 R |
| 3,516,051 | 6/1970 | Arberman et al. | 340/3 R |

*Primary Examiner*—Richard A. Farley
*Attorney, Agent, or Firm*—Watson, Cole, Grindle & Watson

[57] ABSTRACT

The invention relates to a device for adjusting the trigger timing of distance measuring equipment based on measuring the delay time for reflection of transmitted pulses of energy, e.g. echo-sounding equipment. The device comprises a detector designed to indicate whether an echo of prescribed characteristics is received within a prescribed period of time, or whether the echo fails to arrive. A phase comparator determines whether an echo of prescribed characteristics is received before or after the prescribed period of time. A variable-delay circuit is controlled by the detector and the phase comparator in order to delay the triggering of the transmitter of energy pulses, in such a way that echoes of prescribed characteristics will be received within the prescribed region of time, by maintaining the delay constant when the detector indicates echoes within the prescribed period of time, and by increasing or reducing the delay according to command from the phase comparator when the echo is received before or after the prescribed period of time, respectively.

Applied to echo sounding apparatus the echo signal of the prescribed characteristic is usually constituted by the bottom echo signal, and in this case the present timing device will carry out an automatic recorder phasing to always secure a recording of the bottom contour within the automatically set recorder range, irrespectively of changing ocean depth.

2 Claims, 4 Drawing Figures

TRANSMITTER TRIGGER CIRCUIT FOR ECHO-SOUNDERS OR SIMILAR DEVICES

The invention concerns a device for optimizing the recording of echo-sounders, or similar distance measuring equipment based on measuring the delay time for reflection of transmitted pulses of energy.

Presently most echo-sounders are equipped with range selectors with respect to the depth range to be investigated, for example 0 to 50 meters, 0 to 100 meters or 0 to 150 meters. Since all ranges employ the same recording surface, the resolution of the recordings will be less when a larger depth range is confined within this surface.

To preserve resolution echo-sounders are usually also equipped with means for variable recorder timing (phasing) that is, the recording at any one time comprises only part of the full depth range, for example 0 to 50 meters, 50 to 100 meters or 100 to 150 meters. The recordings thus comprising only 50 meters at a time, their resolution within the 100 to 150 meters range will equal that of the 0 to 50 meters range.

In order to facilitate observations of echo-producing targets located close to the transitions between recorder ranges, these ranges will as a rule overlap, comprising 0 to 50 meters, 40 to 90 meters, 80 to 130 meters, and 120 to 170 meters. Without this overlap, keeping track of targets skipping between recorder ranges, for example between 95 and 105 meters, would be wasting valuable time.

The necessary recorder phasing is achieved by triggering the transmitter of the echo-sounder before the moving pen reaches the paper. The object of the present invention is to provide automatic recorder phasing by automatic timing of the transmitter in accordance with echo-signals of a preselected character, e.g., from the ocean floor. Such echo from the ocean floor (bottom echo) will appear within a pre-selected area of the recording surface.

Thus the invention is related to a device for adjusting the trigger timing of distance measuring equipment based on measuring the delay time for reflection of transmitted pulses of energy, e.g. echo-sounding equipment. According to the invention a detector indicates whether an echo of prescribed characteristics is received within a prescribed period of time, or whether the echo fails to arrive. A phase comparator determines whether an echo of prescribed characteristics is received before or after the prescribed period of time. A variable-delay circuit is controlled by the detector and the phase comparator to delay the triggering of the transmitter of energy pulses, whereby echoes of prescribed characteristics will be received within the prescribed period of time, by maintaining the delay constant when the detector indicates echoes within the prescribed period of time, and by increasing or reducing the delay according to command from the phase comparator when the echo is received before or after the prescribed period of time, respectively.

One embodiment of the invention will be described with reference to the enclosed Figures, in which:

FIG. 1 schematically shows a belt recorder for echo-sounders;

Figure 1:
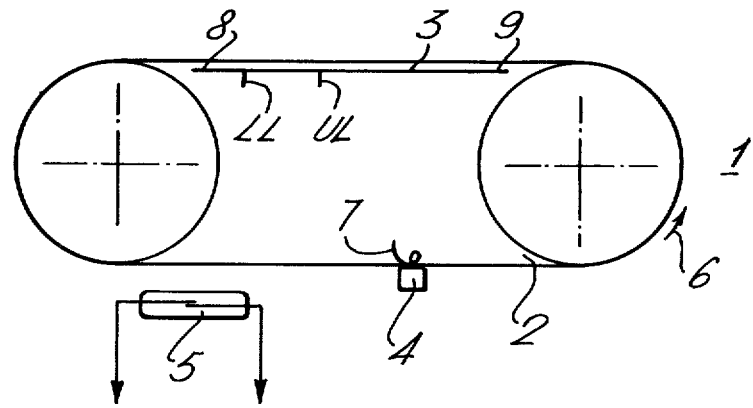

FIG. 1 shows in a schematic way a recorder 1 with recording belt 2 and recording paper 3. On the belt 2 is mounted a permanent magnet 4 which closes a reed relay 5 when magnet 4 is carried past reed relay 5. An arrow 6 shows the belt motion. A pen 7 is mounted close by the magnet 4.

That part of the revolution of the pen 7 which starts at the relay 5 and ends at the left hand (lower) edge 8 of the paper 3, is divided into $n$ segments, starting with zero at the relay 5. Segment $i$ is located at the right hand (upper) edge 9 of the paper 3. Two of the segments between $i$ and $n$, shown as UL and LL, indicate the upper and the lower limit, respectively, of the region prescribed for recording the bottom echo.

Figure 2:
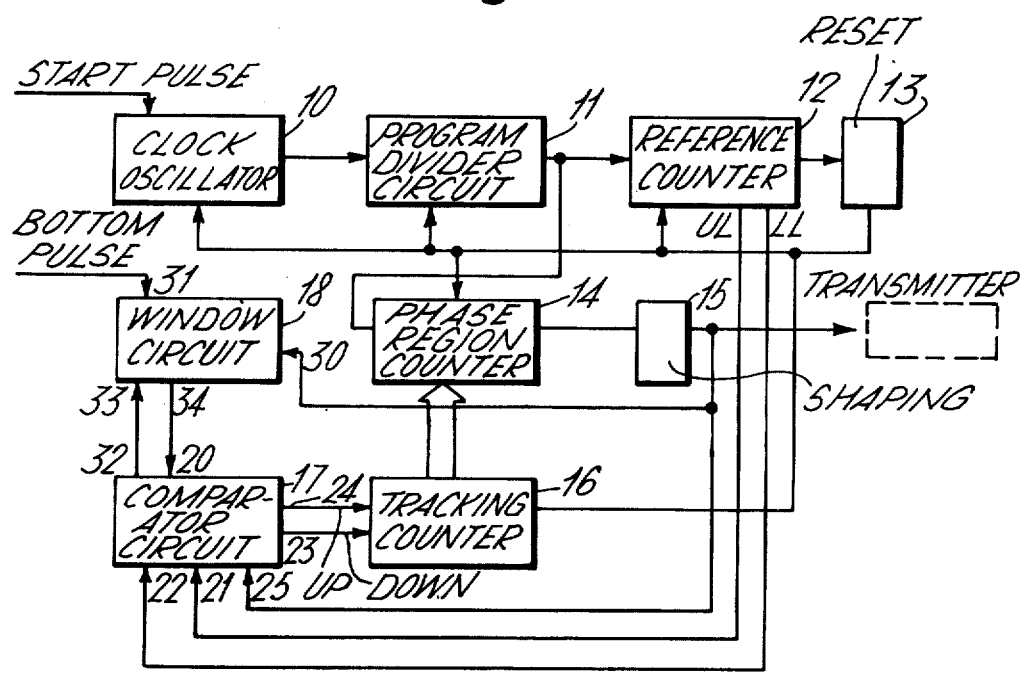
FIG. 2 shows a block diagram of a device according to the invention.

The block diagram of FIG. 2 shows that a pulse (from the reed relay 5) will start a clock (oscillator) 10. This clock 10 controls a divider circuit 11 which may be programmed. The division ratio of the divider 11 will depend upon selection of basic range, which is done manually or automatically. The divider circuit 11 controls a reference counter 12. This counter 12 is synchronized with the motion of the pen 7, which means that each step of the counter 12 corresponds to a definite segment of the motion of the pen 7 between the relay 5 and the lower edge 8 of the paper.

A pair of output terminals on the reference counter 12 represent the upper limit UL and the lower limit LL of the region selected for recording the sea bottom on the paper 3. Upper limit UL means minimum depth, lower limit LL maximum depth, within the prescribed region of the paper. The reference counter 12 includes several terminals, pairs of which may be selected to shift the recording, for example to set aside a region at the bottom of the paper 3 to record temperature when trawling, to expand the recording, or for any other useful purpose.

The last count from counter 12 will trigger a reset circuit 13 which will stop the clock 10 and reset the reference counter 12 and the divider circuit 11 to zero. It will also trigger information transfer from a tracking counter 16 to a phase region counter 14.

The phase region counter 14 is driven by the programmed divider circuit 11. The output from 14 passes through a pulse shaping circuit 15 and triggers the transmitter of the echo sounder. The trigger point (count) for the phase region counter 14 is pre-selected for each sounding cycle by a tracking counter 16 which serves as a memory for the phase region counter 14. The output signal from the tracking counter 16 will depend upon the current depth reading, and will govern the delay, according to basic range between the starting of the clock 10 by the reed relay 5 and the triggering of the transmitter. This is done by partially filling the phase region counter 14 (preset) before the start of the clock cycle. The number of clock pulses required for filling up the phase region counter 14, thus triggering the transmitter, will depend upon the preset count, and accordingly upon the current depth. Information transfer from the tracking counter 16 to counter 14 is governed by the reset circuit 13. The tracking counter 16 is controlled by a comparator circuit 17 in such a way that the stored starting count at any one time will correspond to the depth actually encountered.

The comparator 17 is coupled to the upper limit (UL) and the lower limit (LL) terminals on the reference counter 12, and determines whether the echo from the bottom is received above or below (before or after) the prescribed region on the recording paper 3. If the echo lies above that region, comparator 17 will deliver a pulse which will cause the tracking counter 16 to take one step down, and if below, one step up.

The comparator circuit 17 receives the bottom echo from a "window" circuit 18, which is controlled by comparator circuit 17 as is described hereinafter with respect to FIGS. 3 and 4. The window circuit 18 evaluates whether the bottom echo is received within the prescribed recorder region.

The window circuit 18 and the comparator circuit 17 are reset by the trigger pulse from the pulse shaping circuit 15. The window circuit 18 is designed to require that the bottom echo stray from the prescribed region four times before a bottom pulse is transmitted to the comparator 17 for correction of the tracking counter 16. This prevents the trigger point from being shifted by false echoes produced by noise of various kinds.

The embodiment just described makes use of a phase region covering 20 per cent of the width of the recording paper 3, while the window comprises 40 per cent. One hundred per cent phasing hysteresis is thus achieved, which prevents the trigger timing from fluctuating back and forth when the bottom echo falls close to one of the limits.

Two of the blocks in FIG. 2, the comparator circuit 17 and the window circuit 18, will now be explained in more detail.

Figure 3:
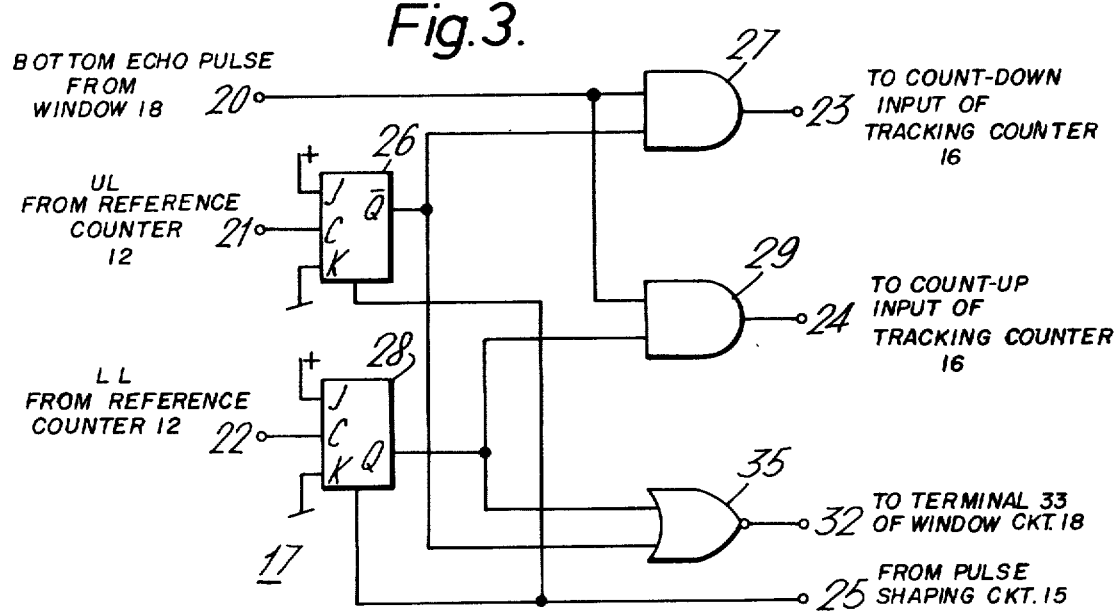
FIG. 3 shows a comparator circuit included in said device.

The comparator circuit 17, which is shown in FIG. 3, receives a bottom echo pulse at terminal 20 from the window circuit 18. Another input terminal 21 is connected to the upper limited (UL) output on the reference counter 12, and similarly terminal 22 to the lower limit (LL) output on 12. Furthermore, input terminal 25 is coupled to the output from the pulse shaping circuit 15. Output 23 is coupled to the "count-down" input on the tracking counter 16, while output 24 is coupled to the "count-up" input on 16.

Terminal 21 (UL) is coupled to the clock input of a JK flip-flop 26. The inverted output of 26 is connected to one input on an AND-gate 27, and also to one input on NOR-gate 35 (negative logic) whose output is terminal 32. The clear input of 26 is connected to terminal 25.

Terminal 22 (LL) is coupled to the clock input of another JK flip-flop 28. The normal output of flip-flop 28 is connected to one input on an AND-gate 29, and also to the other input on NOR-gate 35. The clear input on 28 is connected to terminal 25. Both AND-gates 27 and 29 have one input connected to terminal 20 for bottom echo pulse. The output of AND-gate 27 is connected to terminal 23 and provides "count-down" signal. The output of AND-gate 29 is connected to terminal 24 and provides "count-up" signal.

The comparator circuit 17 functions in the following manner:

The transmitter trigger pulse (entering at 25) will set the normal output of both flip-flops to 0 and the inverse output to 1. This makes the JK flip-flop 26 open gate 27. This gate 27 will remain open until a pulse from the "upper limit" (UL) output on the reference counter 12 will flip-flop 26. If the gate 27 receives a bottom pulse during this open period, that is registering the echo from the bottom too high up on the paper, the bottom pulse will appear at terminal 23 and the tracking counter 16 will count down one step.

During a period of time, from the flipping of JK flip-flop 26 by a signal from the UL terminal on the reference counter 12 to the flipping of the JK flip-flop 28 by the LL terminal, both AND-gates 27 and 29 will be closed. During this period the pen will be located within the region prescribed for recording the bottom echo on the paper 3.

The pulse from LL on counter 12 will flip the JK flip-flop 28, and thus open the AND-gate 29. This gate 29 will remain open until the arrival of the next transmitter pulse. A bottom pulse received during this open period will reach terminal 24 and will cause the tracking counter 16 to count up one step.

Figure 4:
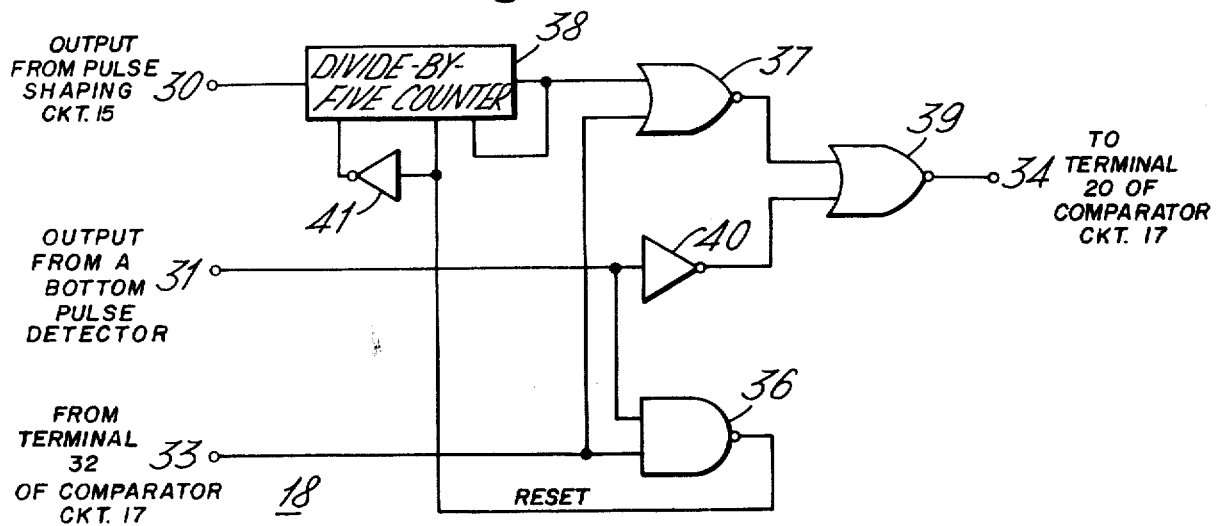
FIG. 4 shows a window circuit included in said device.

The window circuit is shown in FIG. 4. It comprises a terminal 30 which is connected to the output from the pulse shaping circuit 15. Another terminal 31 is connected to a bottom pulse detector (not shown).

A third terminal 33 is connected to terminal 32 on the comparator circuit 17. The fourth terminal 34, which is the output from the window circuit 18, is connected to the bottom pulse input terminal 20 on the comparator circuit 17. Terminal 33 is connected internally to a NAND-gate 36 and a NOR-gate 37.

Terminal 30 is connected to the clock input on a divide-by-five counter 38, for example type SN 7490. Each (transmitter) trigger pulse will thus produce one forward count in counter 38.

If the bottom echo is received within the prescribed region on the paper, the gate 36 will be open, and the bottom echo pulse will travel from terminal 31 to the counter 38, and will reset it to zero.

However, if the bottom echo is received at any other time, the corresponding pulse will not get by gate 36. The counter 38 will not be reset to zero, and the next transmitter trigger pulse will produce another forward count in 38. As long as this situation prevails, or if the bottom echo fails to be registered at all, the counter 38 will be driven forward by the transmitter trigger pulses.

Upon transmission of four "pings" without reception of bottom echo pulse within the prescribed recorder region, counter 38 will be locked with output four in a high state by a feedback connection to one of the "set" inputs. The other "set" input is kept high by gate 36 as long as the bottom echo reception remains outside the prescribed recorder region. When this fourth output on counter 38 is high, the output of gate 37 will always be low. This output is connected to another gate 39 whose second input is connected to the bottom pulse terminal 31 through an inverter 40. The output of gate 39 is coupled to terminal 34 and thus to the comparator circuit 17 (terminal 20).

As long as the output of gate 37 is low, gate 39 will be open for the bottom echo pulse to reach the comparator circuit 17, which will cause the tracking counter 16 to count up or down according to the time of arrival of the pulse at 17. This search for the correct timing of the transmitter trigger will continue until the bottom echo pulse is received within the prescribed recorder region. When this occurs, the bottom pulse will pass through gate 36 and will cancel the "set" instruction which has kept high the fourth output on counter 38. At the same time this counter 38 is reset to zero by means of an inverter circuit 41.

A simplified embodiment contains reed relays (not shown) for upper and lower limits in place of the reference counter 12. The relays are activated by the magnet 4 on the recorder belt and thus produce limit signals. Another reed relay may similarly replace the reset circuit 13. Although the invention has been described as applied to an electromechanical recorder, it is not limited to this type of echo display. The invention is applicable as well for display, for example, on cathode ray tubes, liquid crystal displays screens, and on cam-actuated recorders which use other means than the motion of a pen to display elapsed time, and thus the distance to sound reflecting objects.

This described embodiment makes use of TTL logic units, but these may easily be replaced by other building blocks which provide identical functions, for example employing CMOS logic, this being obvious to the specialist. The description was concerned with placing the echo from the sea bottom within a prescribed region of the recording paper. Other passive or active echo sources for example remotely controlled submarine vessels, may be tracked automatically in the same manner as long as the special features (signature) of the echo may be identified.

We claim:

1. A device for adjusting the trigger timing of distance measuring equipment measuring the delay time for reflection of transmitted pulses of energy comprising a transmitter for transmitting energy pulses; a detector for indicating an echo of prescribed characteristics received by said device within a prescribed period of time; a phase comparator for determining an echo of prescribed characteristics received before or after said prescribed period of time; and a variable-delay circuit controlled by said detector and said phase comparator to delay the triggering of said transmitter whereby echoes having prescribed characteristics are received by said device within said prescribed period of time by maintaining said delay of the transmitter triggering constant when said detector indicates echoes within said prescribed period of time, and by increasing or reducing said delay of the transmitter triggering in response to said phase comparator when the echo is received before or after said prescribed period of time, respectively.

2. A device according to claim 1, wherein said detector includes means for detecting the absence of echoes having prescribed characteristics received by said device within said prescribed period of time for a preselected number of successive periods of time before the delay of said delay circuit is changed.

* * * * *